Fig. 1.

April 18, 1961   B. E. CARLSON   2,980,106
INCUBATOR
Filed Nov. 10, 1955   8 Sheets-Sheet 2

INVENTOR.
BERNARD E. CARLSON
BY
ATTORNEYS.

April 18, 1961

B. E. CARLSON

2,980,106

INCUBATOR

Filed Nov. 10, 1955

INVENTOR.
BERNARD E. CARLSON
BY
*Lyon & Lyon*
ATTORNEYS.

United States Patent Office 2,980,106
Patented Apr. 18, 1961

2,980,106
INCUBATOR

Bernard E. Carlson, North Hollywood, Calif., assignor, by mesne assignments, to The Colson Corporation, Chicago, Ill., a corporation of Ohio Filed Nov. 10, 1955, Ser. No. 546,249

14 Claims. (Cl. 128—1)

My invention comprises an incubator, and, more specifically, an incubator for use in hospitals and the like for the care of infant humans.

A purpose of my invention is to construct an incubator in which the humidity and flow of air are controlled and are controllable by an operator.

Another purpose of my invention is to construct an incubator which has a basic ventilation pattern that provides a fixed flow of air through the incubator.

Another object of my invention is to provide means to vary the basic ventilation flow for different purposes and to control the heat in said incubator.

Another object of my invention is to provide an incubator in which the oxygen flow is limited to prevent unsafe concentrations.

Other objects and advantages of my invention will be apparent from the following description of the preferred embodiments thereof.

Figure 1:
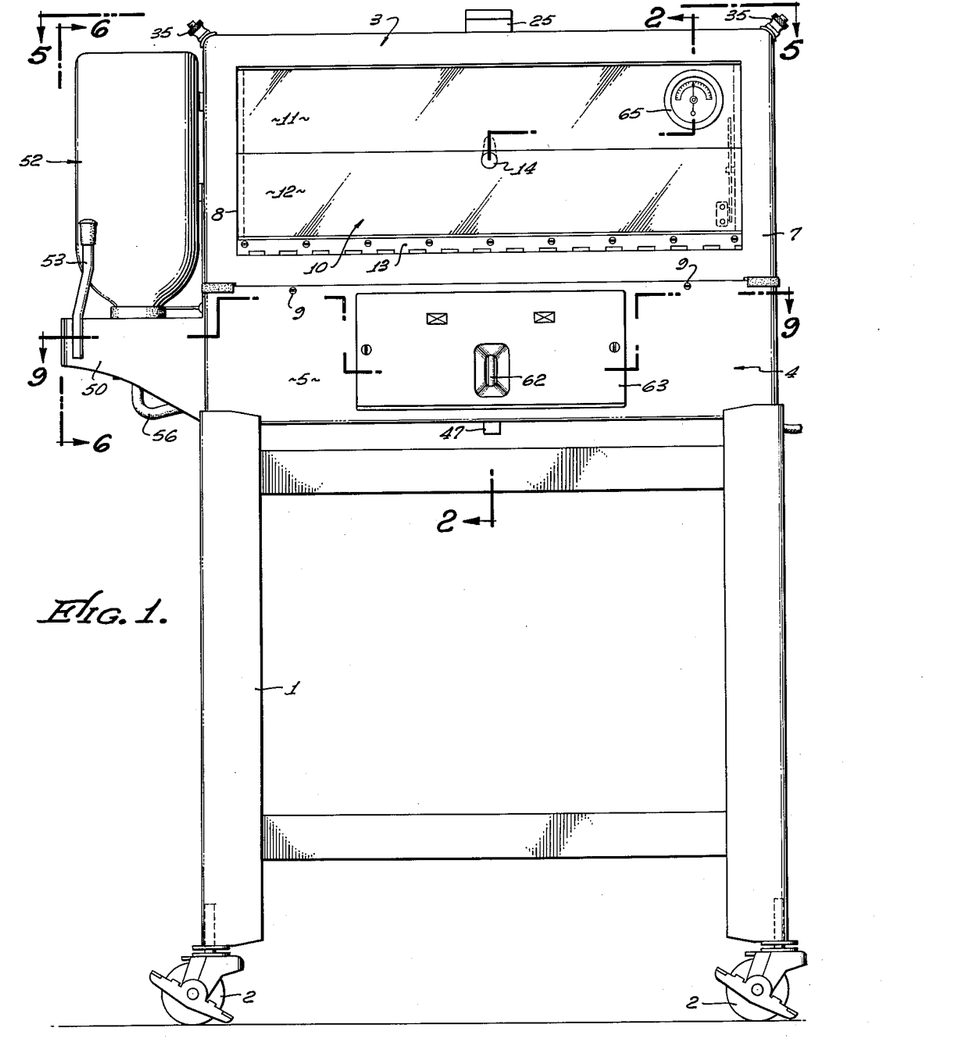
Figure 1 is a front elevation of the preferred embodiment of my incubator.
Figure 2:
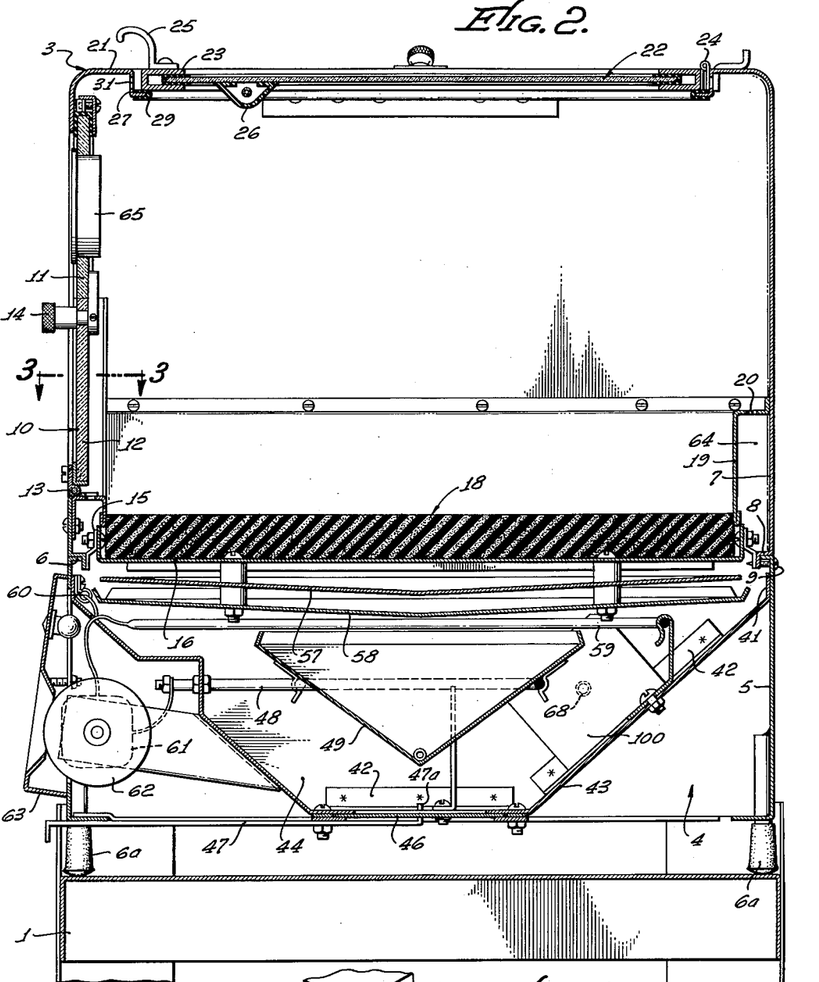
Figure 2 is a section taken on line 2—2 on Figure 1.
Figure 3:
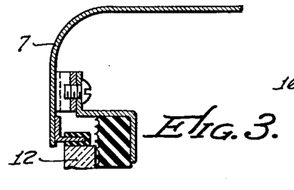
Figure 3 is a section taken on line 3—3 on Figure 2.
Figure 4:
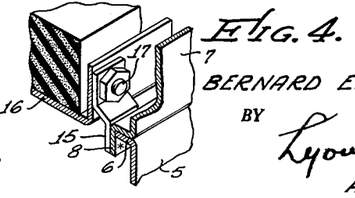
Figure 4 is an enlarged partial perspective of a detail.
Figure 5:
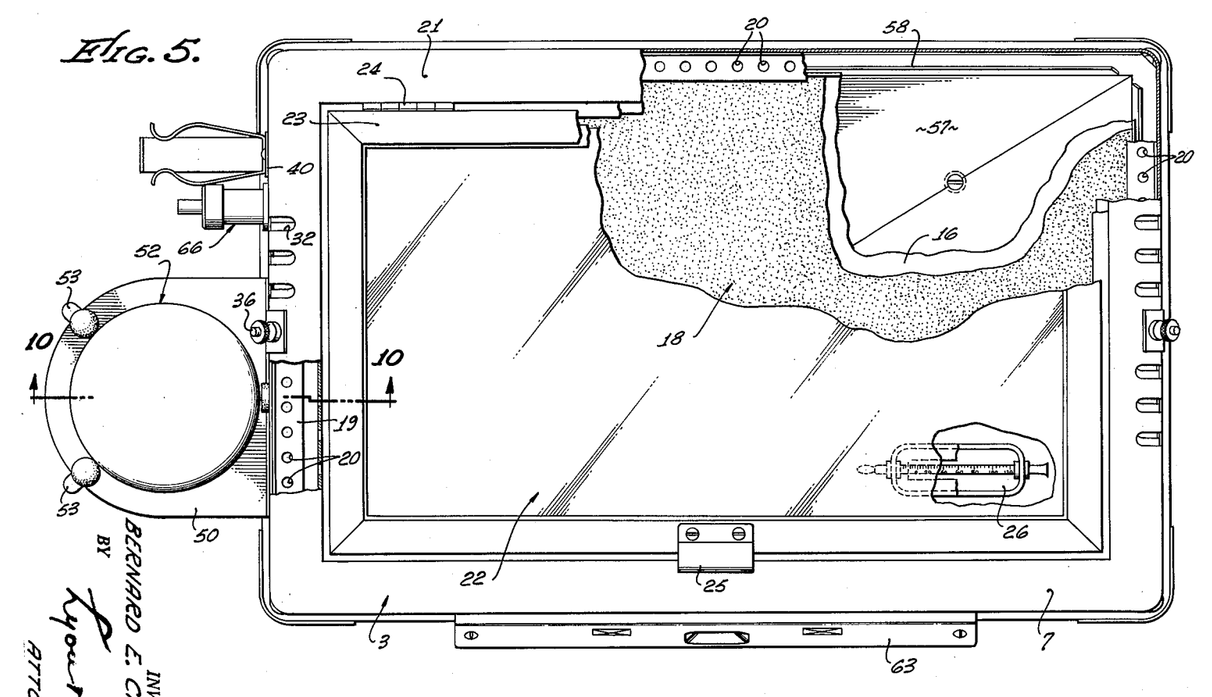
Figure 5 is a top plan view partially broken away.
Figure 6:
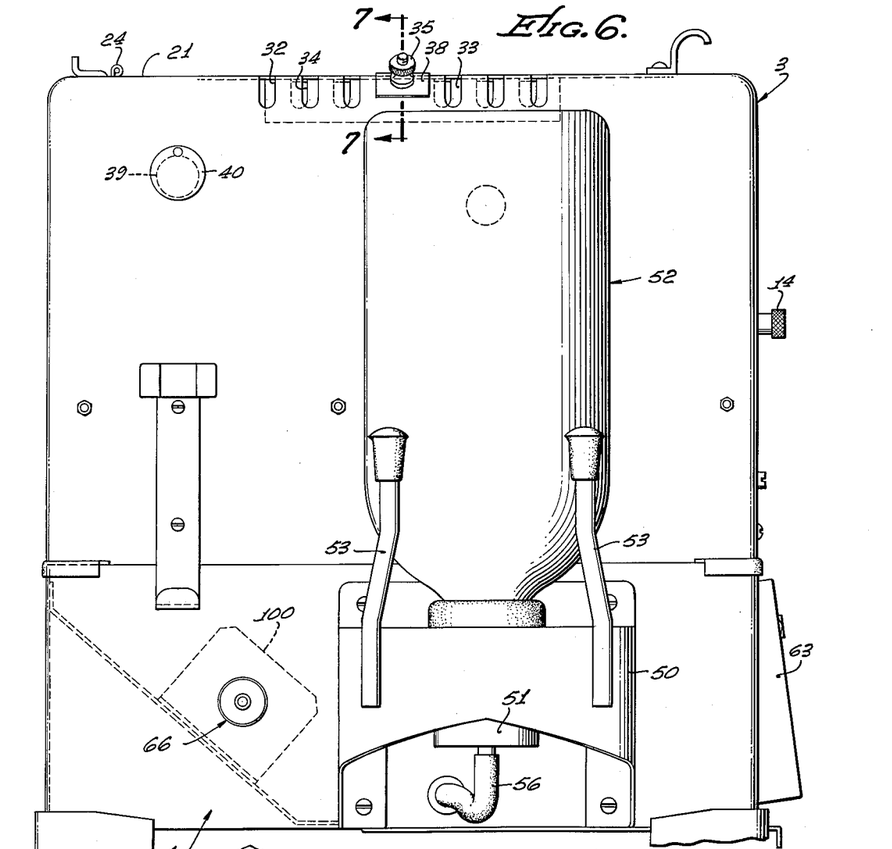
Figure 6 is a partial end elevation taken on line 6—6 on Figure 1.
Figure 7:
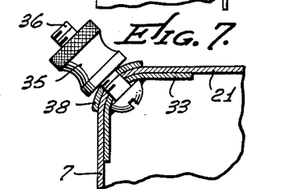
Figure 7 is a section taken on line 7—7 on Figure 6.

An incubator constructed in accordance with my invention is adapted to be mounted upon any suitable table, for instance, the table 1 shown in Figure 1, which is mounted upon casters 2 for easy movement. My incubator comprises two units, generally indicated as the crib unit 3, and the control unit 4. The control unit 4 comprises an external sheet metal box 5, which has rubber feet 6a at its four corners for mounting upon the top of the table 1. The top of the control unit 4 is open and the box 5 has a flange 6 running around the top perimeter upon which the crib unit 3 rests. The crib unit 3 comprises a metal frame 7, with a flange 8 around its lower edge for engaging the flange 6. Bolts 9 are used to fasten the frame 7 to the box 5, but are removable for servicing.

The front face 10 of the crib unit is formed to have the metal frame 7 surround a window which is formed in two parts, 11 and 12. The window part 11 is permanently affixed and not moveable in the frame 7, while the window part 12 is attached to the frame 7 by means of a piano hinge 13 adapted to permit the window part 12 to open outwardly. A latch 14 is provided to hold the window part 12 closed. It is to be understood that the window parts 11 and 12 can be made of any desirable transparent material such as plastic or glass, so as to permit visual inspection of the interior of the crib unit.

A series of hangers 15 are welded to the flange 8 to provide a support for a pan 16, which is held in place by nuts and bolts 17. The pan 16 covers and encloses most of the opening in the top of the control unit 4 and provides a support for the bed unit generally indicated at 18.

As the humidity, heat and oxygen control of the crib unit are all controlled by the air mixture passing up around the outside of the pan 16, and it is not desirable to have a direct flow onto the top of the bed unit 18, I provide the members 19, which are welded to the frame 7 around the inner perimeter thereof which extend down into contact with the upper edges of the pan 16, to prevent any direct flow of air onto the top surface of the bed unit 18. To permit the air from the control unit 4 to enter the crib unit 3, I provide a series of holes 20, about an inch apart, around the entire perimeter of the member 19 adjacent to the frame member 7. The member 19 also prevents a baby upon the bed 18 from putting its hands or feet down into the draft or in handling any of the control unit below the pan 16. The member 19 prevents obstruction of the holes 20 by bed clothes and also directs the flow of air upwards so that opening the window 12 only slightly alters the temperature, humidity and oxygen concentration of the incubator.

Figure 8:
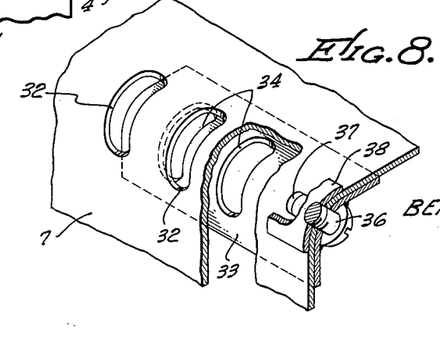
Figure 8 is an enlarged partial perspective of a detail.
Figure 9:
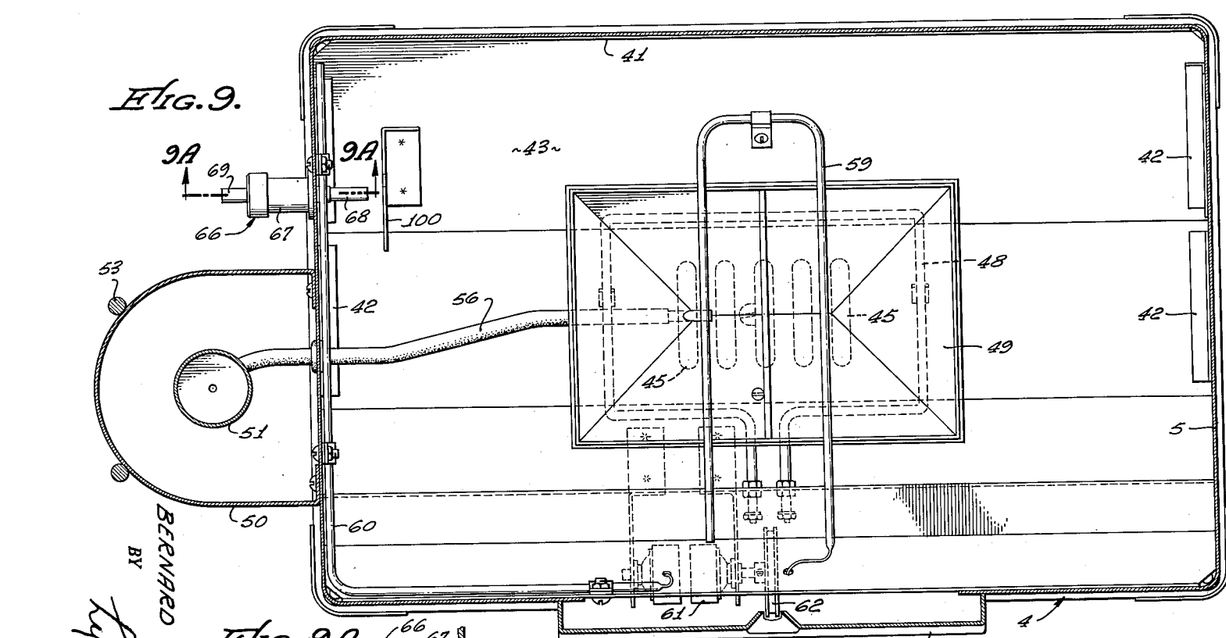
Figure 9 is a section taken on line 9—9 on Figure 1.
Figure 9A:
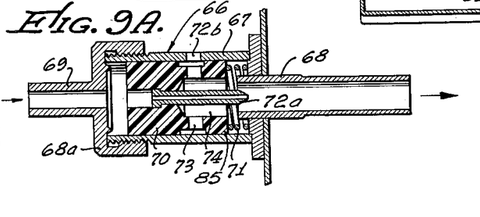
Figure 9A is a section taken on the line 9A—9A on Figure 9.
Figure 10:
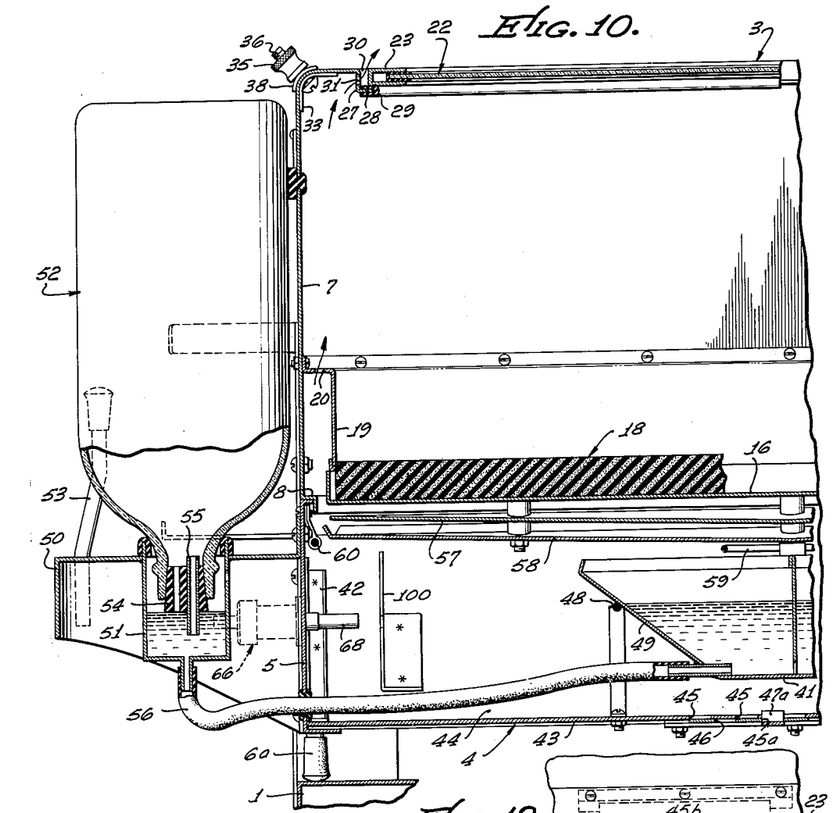
Figure 10 is a section taken on line 10—10 on Figure 5.
Figures 11, 12:
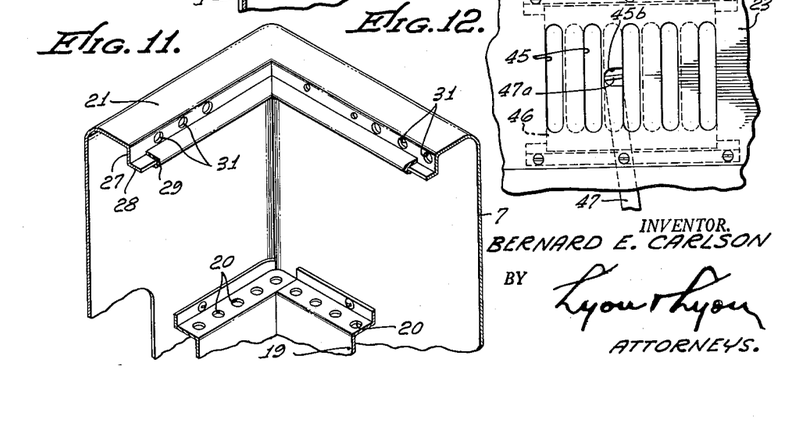
Figure 11 is an enlarged perspective of a detail.
Figure 12 is a partial section taken on line 12—12 on Figure 13.
Figures 13, 14:
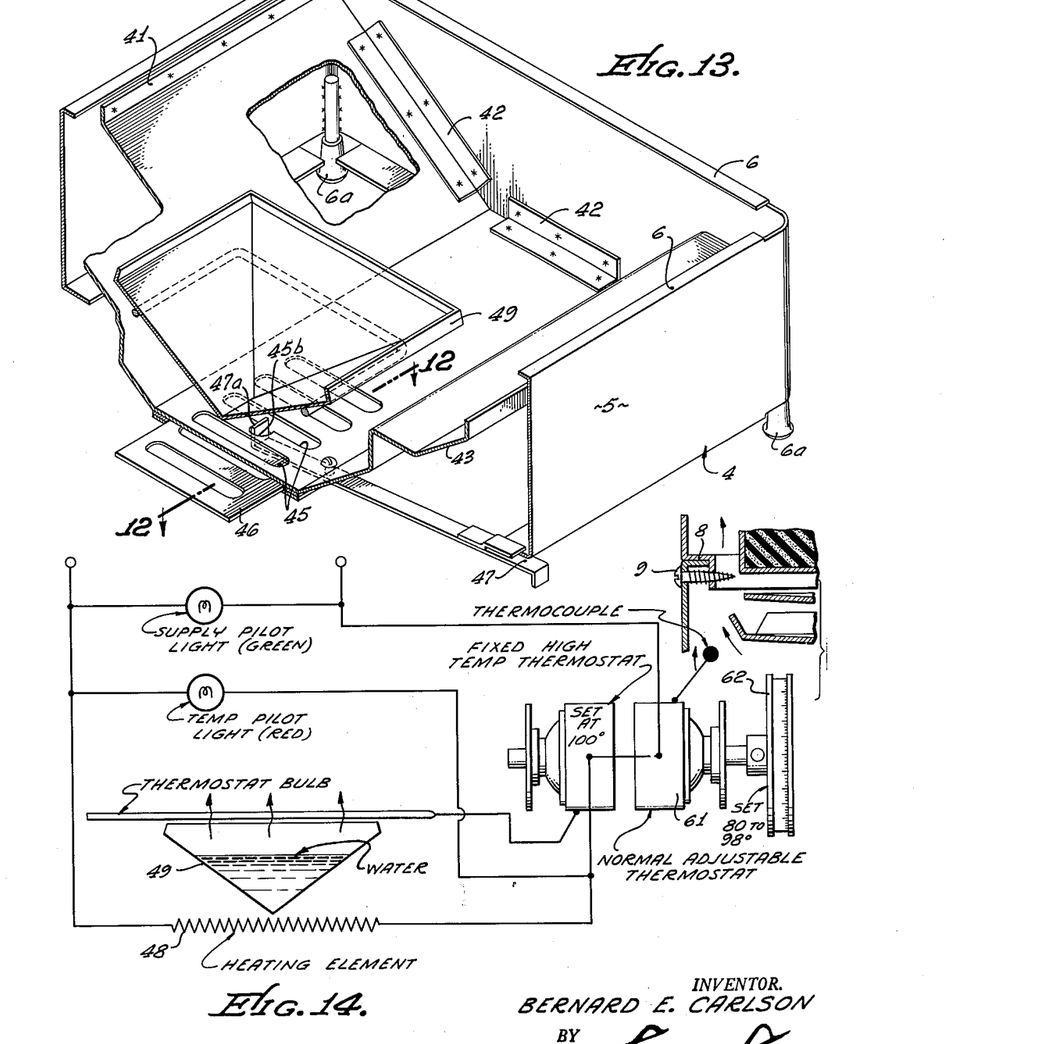
Figure 13 is a perspective of a portion of the control unit with the crib unit removed.
Figure 14 is a schematic electrical drawing.

The top 21 of the crib unit 3 comprises the exterior edges which are part of the metal frame 7 and which deflect the flow of air downwardly. Into this is set a transparent door 22, which is held in a frame 23 hinged at 24 to the frame 7. A handle 25 permits the lifting of the door 22 to remove or place a baby in the crib unit. A thermometer 26 is attached to the window 22 so that it can be read through the window, to indicate temperatures in the crib unit 3. A downwardly extending flange member 27 has an inwardly extending flange 28, which is wrapped with a rubber seal 29, upon which the window frame 23 rests, to make an air seal around the perimeter of the window 22. A vent 30 is provided between the downward extending flange member 27 and the outer edge of the window frame 23. Through the downward extending flange member 27 and communicating with the vent 30 are a series of equally spaced holes 31 to permit air to pass from the interior of the crib unit to the atmosphere. To provide adjustable ventilation, I also provide a series of shutter-type vents shown in detail in Figure 8. These vents are on the two ends of the crib unit 3 and comprise a series of slots 32 along the end of the crib unit extending through the frame 7. These can be opened or closed by a shutter 33 mounted on the interior of the frame 7 and having complementary slots 34 attached to the space adjacent to the slots 32 to permit a direct ventilation. A thumb screw 35 is mounted on a bolt 36 attached to the shutter 33 and is moveable in a slot 37 in the frame 7. A cover plate 38 seals off the slot 37 from the interior. By releasing the thumb screw 35 the shutter can be adjusted so that the slots 34 and 32 are in line, or partially in line, or out of alignment, thus opening or closing the auxiliary ventilation exits.

To provide a fast injection of oxygen into the crib unit or to permit the use of an oxygen face mask on the baby with the hose extending out to a supply of oxygen, I provide an entry port 39 in one end of the crib unit, which is ordinarily sealed by a swinging plate 40. Of course, the entry port 39 can be used for the attachment of the nebulizer for medication.

On the inner surface of the fixed window 11 is attached a humidity indicator 65 in such a position that it can be read from the exterior of the crib unit without opening any of the transparent doors and without interference from condensation caused by the high humidity inside the incubator.

Welded around the upper edges of the sheet metal box 5 at 41 and extending downwardly and welded to the ends at 42 is a metal shield 43. This shield 43 closes the interior 44 of the control unit 4 from the bottom and has a series of slots 45 in its bottom to permit the entry of air into the interior 44. The size of the slots 45 and the amount of air that can enter is controlled by the shutter 46, which is moveable by the control rod 47. Slots 45a and 45b in the shutter 46 and the shield 43 receive the end 47a of the control rod 47 and leave a constant opening into the control unit 4. These slots 45a and 45b provide the entrance for the basic air flow of my incubator. The shutter 46 cooperating with the slots 45 is for increasing the basic flow just as shutter 33 and slots 34 and 32 provide for an increased exit. The basic air flow in my incubator is that provided by a flow of air in through the slots 45a and 45b and out through the holes 31 and vent 30. At any given temperature the basic air flow is a constant amount and eliminates any chance of suffocating the incubator's occupant.

A heating element 48, of the electrical resistance type, is supported by the shield 43 and forms a support for a water container 49. On the exterior of the control unit 4 is bolted a support 50, which has a well 51 therein. A water bottle 52 is held in position upon the support 50 and its neck extends down into the well 51. The members 53 maintain the bottle 52 in position. The bottle 52 has a two-hole stopper 54, one of which holes has a tube 55 which extends outwardly from the stopper 54. A tube 56 connects the well 51 to the water container 49. By this arrangement, when a bottle of water 52 is inverted and placed in the well 51, the water will run from the bottle 52 into the well 51, through the tube 56 into the water container 49, until the level in the water container 49 is at the same level as the bottom edge of the stopper 54. When there is evaporation of the water in the container 49 it will be immediately replaced and the water level maintained at this set point.

A plurality of baffles, such as those shown at 57 and 58, are supported by the pan 16 between the pan 16 and the water container 49. These baffles limit the direct transfer of heat to the bottom of the pan 16 so that the bed unit 18 is maintained at a temperature only slightly above that of the incubator atmosphere. This allows the bed and bed clothes to be kept dry in spite of the 75-95% humidity in the incubator.

I provide a safety thermostat bulb 59 between the baffles 58 and the top of the water container 49, which is set to shut off the power to the heating element 48 to prevent the temperature in the main portion of the crib unit 3 from reaching an unsafe level; for example, 100° Fahrenheit. A second thermostat bulb 60 is positioned at one end of the control unit adjacent to the ends of the baffles 57 and 58, which can be set by the adjustable thermostat 61 at any temperature between 80 and 98 degrees Fahrenheit. The adjustable thermostat 61 is controlled by a dial 62 mounted upon a control panel 63 so that it may be operated from the exterior of the unit.

The operation of my incubator is as follows:

In an incubator it is necessary to control the temperature and humidity and to provide adequate ventilation, and at the same time prevent air currents from striking the baby. As will be noted, the passage of air through my incubator is as follows: The air enters the shield 43 of the control unit 4 through the slots 45a and 45b, passes up and around the water container 49 where humidity and heat are added. The baffles 58 then direct this flow of air past the supports for the bed pan 16, into the passage 64 between the members 19 and the frame 7, where it passes out through the holes 20 into the upper portion of the crib unit 3. It then passes out through the holes 31 and vents 30 to the atmosphere. It should be noted that the amount of air entering the incubator can be controlled by the adjustment of the shutters 46 and 33. Such an adjustment, of course, is used to control the humidity as indicated by the humidity indicator 65 mounted on the interior of window 11. To prevent the temperature in the crib unit from reaching an unsafe level, I have provided a safety thermostat bulb 59 connected to a fixed thermostat which automatically shuts off the heating element 48 when the temperature above the pan 49 exceeds a preset limit.

One of the purposes of an incubator is to provide external heat when the baby's system will not provide the same. The amount of this heat is controlled by the doctor and is provided by the heating of the water container 49 and is controlled by the thermostat bulb 60 connected to the adjustable thermostat 61. The additional heat that is added to the crib unit 3 to overcome the lack of body heat for the baby is adjusted by setting the adjustable thermostat 61 so that the desired heat passes up through the passage 64. The humidity is added by moist air flowing over the side of the pan 49 into the basic air flow. The combination of the constant water level, the basic air flow and a constant supply of heat maintains the added humidity constant. By varying the amount of air that is allowed to pass through the incubator we can control this relative humidity. By increasing the basic air flow, more air mixes with the fixed humidity generated, thus lowering the relative humidity in the crib. By closing the vents and allowing less air to be mixed with the fixed humidity generated we get a higher relative humidity in the crib. The humidity indicator 65 permits the operator to adjust the aforesaid vents to obtain the desired humidity.

Another feature of my invention is the incorporation into the incubator of an oxygen limiting device generally indicated at 66. It has been found that if the percentage of oxygen in an incubator exceeds 40 percent that it may cause Retrolenthal Fibroplasia, which sometimes results in permanent blindness. The oxygen limiting device 66 is therefore incorporated into my incubator so that oxygen is ported into the flow of air in the control unit 4. The amount of oxygen is determined externally by a flow meter and passes into the control unit through the limiting device 66, which comprises a housing 67 which is attached to the control unit and has a pipe 68 extending therein. The housing 67 has a cap member 68a with a nipple 69 for connection of a hose from a source of oxygen. A valve body 70 is slidably mounted in the housing 67 and is maintained in position by a spring 71. The valve body 70 is preferably made of plastic and provided with a flexible skirt 85 which flares out against the housing 67 to prevent leakage of oxygen past the valve body 70. In the valve body 70 is positioned a venturi tube 72a, which permits oxygen to pass from the nipple through the valve body 70 into the tube 68. The housing 67 has ports 72b to the atmosphere. The valve body 70 has complementary ports 73 which communicate with the ports 72b and an enlarged bore 74 in the valve body 70. The enlarged bore 74 is in direct communication with the pipe 68. The operation of this device is as follows: The spring 71 is set to maintain the valve body 70 substantially in contact with the cap 68a. When oxygen passes through the venturi 72a and its velocity becomes high enough the back pressure on the venturi 72a will cause the valve body 70 to move and compress the spring 71. When this happens, the ports 72b and 73 align and air from the atmosphere is drawn into the pipe 68 by the jet action of the venturi 72a. The spring 71 is set so that the valve body is held against the cap 68a, sealing the ports 72b and 73 until the oxygen has a flow of approximately four liters per minute. By such an adjustment the oxygen concentration in the air flow through my incubator will be approximately 40 percent and if the oxygen flow increases the limiting device 66 ports air into the ports 72b and 73 to prevent the concentration from passing 40 percent. With the basic ventilation in my incubator I have found that the addition of oxygen at the rate of one liter per minute through the control device 66 will cause a concentration of oxygen in the crib of about 27 percent; that upon increasing the volume of flow of the oxygen through the limiting device 66, the concentration in the crib rises until at approximately four liters per minute the concentration in the crib is 40 percent. If the flow rate increases above this point any excess of concentration is prevented by the opening of the ports 72b and 73 and the addition of external air into the oxygen flow. This maintains the oxygen concentration of the incubator at about 40 percent.

It should be noted that the tube 68 does not just open into the interior of the control unit, but strikes a baffle 100 so as to disburse the oxygen. By thus disbursing the oxygen in this manner the basic ventilation is disturbed slightly and puts more humidity into the air. Without the baffle 100 the humidity is uneven on opposite sides of the incubator. I have found that this increase in humidity, while unexpected, makes it unnecessary to have a complicated mechanism for increasing humidity. Higher humidity is desirable when using oxygen. Oxygen is dryer than air and tends to lower humidity.

Figure 15:
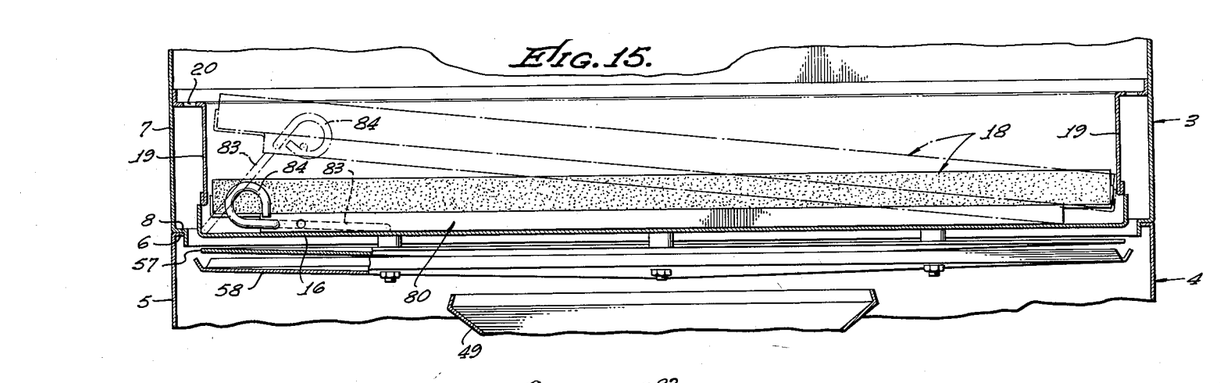
Figure 15 is a diagrammatical view of a detail.
Figures 16, 17:
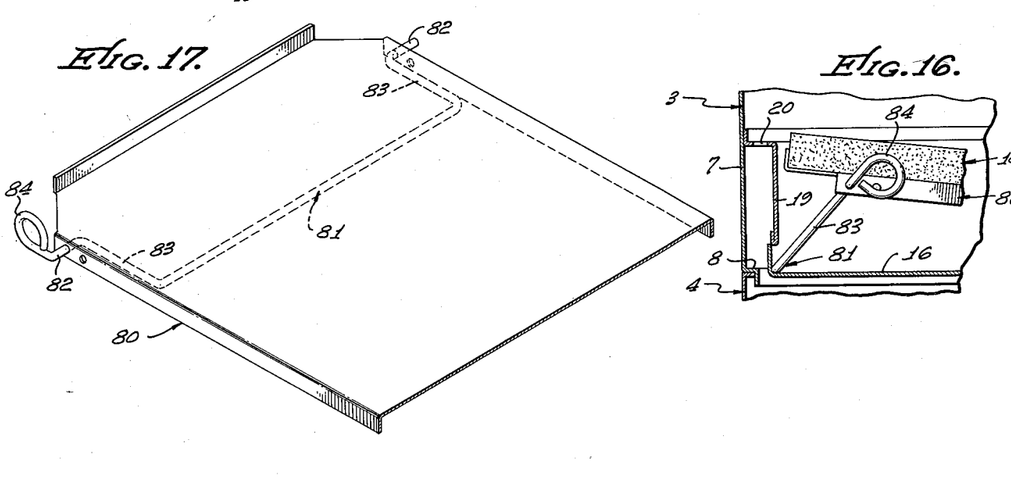
Figure 16 is an enlarged view of a detail.
Figure 17 is a perspective of a base plate for supporting the child.

In certain therapy it has been found desirable to have the baby's head either above the horizontal or below it. I have therefore provided in my incubator an adjustable bed. This is shown specifically in Figures 15, 16 and 17 and comprises an auxiliary bed plate 80, which rests upon the bed pan 16. The bed unit 18 rests upon this auxiliary plate 80. At either one or both ends of the auxiliary pan 80 is attached a tilting device which comprises a rod 81, which has journals 82 to provide rotation. The rod 81 has offset arms 83 connecting the journals 82 and the main cross-arm 81. Extending from the journals 82 are loop members 84. The loop 84 forms a handle to rotate the rod 81 on its journal 82. When the handle 84 is rotated upwardly the extension 83 moves the main portion 81 into a downwardly extending position, which raises the auxiliary pan 80 at one end while the other end of the pan 80 is held at its ordinary level by the pan 16.

I claim:

1. In an incubator a control unit, a crib unit, an air passage between said units, an air opening into said control unit and an exit port from said crib unit, said opening and port adapted to pass a basic circulation of air through said crib unit, means for admitting oxygen to said basic circulation, and valve means adapted to admit air to the oxygen admitting means when the oxygen flow rate exceeds that which will provide a 40 percent concentration of oxygen in the incubator.

2. In an incubator a control unit, a crib unit, an air passage between said units, an air opening into said control unit and an exit port from said crib unit, said opening and port adapted to pass a basic circulation of air through said crib unit, means for inserting controlled humidity to said air flow, said means comprising a water container in said control unit, means for heating said container and means to port water to said container and to maintain the water in said container at a constant level, control means for increasing said basic flow of air, said means comprising entrance ports and exit ports having adjustable shutters, valve means for admitting oxygen to said basic circulation adapted to prevent the concentration of said oxygen from exceeding 40 percent.

3. In an incubator a control unit, a crib unit, an air passage between said units, an air opening into said control unit and an exit port from said crib unit, said opening and port adapted to pass a basic circulation of air through said crib unit, means for inserting controlled humidity to said air flow, said means comprising a water container in said control unit, means for heating said container and means to port water to said container and to maintain the water in said container at a constant level, control means for increasing said basic flow of air, said means comprising entrance ports and exit ports having adjustable shutters, means for registering the heat supplied to said crib unit adapted to automatically shut off the heat to said water container heater to prevent said heat in said crib from reaching an unsafe level, means for heating said basic air circulation and means to control said last stated heating means to provide a temperature range between 80° and 98° Fahrenheit, valve means for admitting oxygen to said basic circulation adapted to prevent the concentration of said oxygen from exceeding 40 percent.

4. In an incubator, means for producing a basic air flow through said incubator, means for controlling the heat in the incubator, means for controlling the humidity in the incubator, an oxygen supply tube leading to the incubator, a venturi passage in the supply tube, and an air port associated with the venturi passage and adapted to admit sufficient air to prevent the oxygen concentration in the incubator from exceeding 40 percent.

5. In an incubator means for producing a basic air flow through said incubator, means for controlling the heat in said incubator, means for controlling the humidity in said incubator, and means for admitting oxygen to said basic air flow, comprising a valve connected between said air flow and a supply of oxygen, said valve having a housing, a piston slidable in said housing, a venturi passage through said housing to provide a passage for oxygen from said supply of oxygen to said incubator, ports in said piston and said housing alignable to port air from the atmosphere to said incubator, a spring adapted to hold said piston in a position where said air ports are not aligned unless the flow of oxygen through said venturi compresses said spring and aligns said ports.

6. In an incubator a control unit, a crib unit, an air passage between said units, an air opening into said control unit and an exit port from said crib unit, said opening and port adapted to pass a basic circulation of air through said crib unit, means for inserting controlled humidity to said air flow, said means comprising a water container in said control unit, means for heating said container and means to port water to said container and to maintain the water in said container at a constant level, control means for increasing said basic flow of air, said means comprising entrance ports and exit ports having adjustable shutters, and means for admitting oxygen to said basic air flow comprising a valve connected between said air flow and a supply of oxygen, said valve having a housing, a piston slidable in said housing, a venturi passage through said housing to provide a passage for oxygen from said supply of oxygen to said incubator, ports in said piston and said housing alignable to port air from the atmosphere to said incubator, a spring adapted to hold said piston in a position where said air ports are not aligned unless the flow of oxygen through said venturi compresses said spring and aligns said ports.

7. In an incubator a control unit, a crib unit, an air passage between said units, an air opening into said control unit and an exit port from said crib unit, said opening and port adapted to pass a basic circulation of air through said crib unit, means for inserting controlled humidity to said air flow, said means comprising a water container in said control unit, means for heating said container and means to port water to said container and to maintain the water in said container at a constant level, control means for increasing said basic flow of air, said means comprising entrance ports and exit ports having adjustable shutters, means for registering the heat supplied to said crib unit adapted to automatically shut off the heat to said water container heater to prevent said heat in said crib from reaching an unsafe level, means for heating said basic air circulation and means to control said last stated heating means to provide a temperature range between 80° and 98° Fahrenheit and means for admitting oxygen to said basic air flow comprising a valve connected between said air flow and a supply of oxygen, said valve having a housing, a piston slidable in said housing, a venturi passage through said housing to provide a passage for oxygen from said supply of oxygen to said incubator, ports in said piston and said housing alignable to port air from the atmosphere to said incubator, a spring adapted to hold said piston in a position where said air ports are not aligned unless the flow of oxygen through said venturi compresses said spring and aligns said ports.

8. In an incubator a control unit, a crib unit, an air passage between said units, an air opening into said control unit and an exit port from said crib unit to the atmosphere, said opening and port adapted to pass a basic circulation of air through said crib unit, a water container in said control unit, means for heating said container, an oxygen supply tube, and means for dispersing the gases from said tube into the basic circulation in the control unit at a point below and close to the water container so as to disturb the basic circulation around the water container thus increasing the supply of humidity when oxygen is used.

9. In an incubator a control unit, a crib unit located above and supported by said control unit, a bed in said crib unit, an air opening into the bottom of said control unit and an exit port from the top of said crib unit to the outside atmosphere, an air passage between the outer perimeter of the bed and the inner perimeter of the crib unit and leading from the control unit to the crib unit, said opening, passage, and port adapted to pass a basic vertical flow of air from the atmosphere through said control unit and said crib unit, adjustable shutters on the control unit air opening and on the crib unit exit port for controlling said basic flow of air, an open topped water container located in the path of the basic air flow in the control unit, so that the basic air flow passes around said container, a heating element in contact with the base of said container and adapted to heat both the container and the basic air flow, thermostatic control means located in the air passage and adapted to automatically control the temperature of the basic air flow and baffle means insulated from the bottom of said crib unit for deflecting the air flow to the peripheral air passage.

10. In an incubator a control unit, a crib unit located above said control unit, a bed in said crib unit, an air opening into the bottom of said control unit and an exit port from the top of said crib unit, an air passage between the outer perimeter of the bed and the inner perimeter of the crib unit and leading from the control unit to the crib unit, said opening, passage, and port adapted to pass a basic vertical flow of air through the control and crib unit, adjustable shutters on the control unit air opening and on the crib unit exit port for controlling the basic flow of air, a water container located in the path of the basic air flow, a heating element adapted to heat both the container and the basic air flow and baffle means insulated from the bottom of said crib unit for deflecting the basic air flow to the peripheral air passage.

11. In an incubator, means for producing a basic air flow through said incubator, means for controlling the heat in the incubator, means for controlling the humidity in the incubator, an oxygen supply tube leading to the incubator, a venturi passage in the supply tube, an air port associated with the venturi passage, and valve means normally closing said port but adapted to open the port when the oxygen flow rate exceeds that which will provide a 40 percent concentration of oxygen in the incubator.

12. In an incubator, means for producing a basic air flow through said incubator, means for controlling the heat in the incubator, means for controlling the humidity in the incubator, an oxygen supply tube leading to the incubator, a venturi passage in the supply tube, an air port associated with the venturi passage, a valve means in the supply tube, a housing on said valve means, a piston slidable in the housing, and a spring adapted to hold the piston in a position closing the air port unless the flow of oxygen exceeds a predetermined rate causing the piston to move forward compressing said spring.

13. An incubator comprising: a control unit; a crib unit; an air opening into the control unit and an exit port from the crib unit to the atmosphere, said opening and port being adapted to pass a basic circulation of air through the control and crib units; a bed support fixedly mounted in the crib unit and spaced from the walls thereof on all sides; a bed on said support; air passages between the control unit and the crib unit, each of said passages being defined by a wall of the crib unit and a wall of the bed support; partition members extending upwardly on all sides of the bed support; an air passage extension defined by each partition member and the adjacent crib unit wall; and means connecting the top of each partition member with the adjacent wall of the crib unit thereby closing the top of each air passage extension substantially above the bed, each of said means having a plurality of upwardly directed inlet openings connecting each air passage extension with the crib unit.

14. An incubator as set forth in claim 13 wherein the openings are spaced substantially equidistantly around the top of the air passage extension.

References Cited in the file of this patent

UNITED STATES PATENTS

| 759,612 | How | May 10, 1904 |
| 1,688,200 | Morganthaler | Oct. 16, 1928 |
| 2,243,999 | Chapple | June 3, 1941 |
| 2,246,820 | Taylor | June 24, 1941 |
| 2,417,962 | Armstrong | Mar. 25, 1949 |
| 2,638,087 | Livsey | May 12, 1953 |
| 2,662,521 | Armstrong et al. | Dec. 15, 1953 |
| 2,720,387 | Dorsak | Oct. 11, 1955 |

FOREIGN PATENTS

| 1,085,407 | France | July 28, 1954 |